Figure 1:
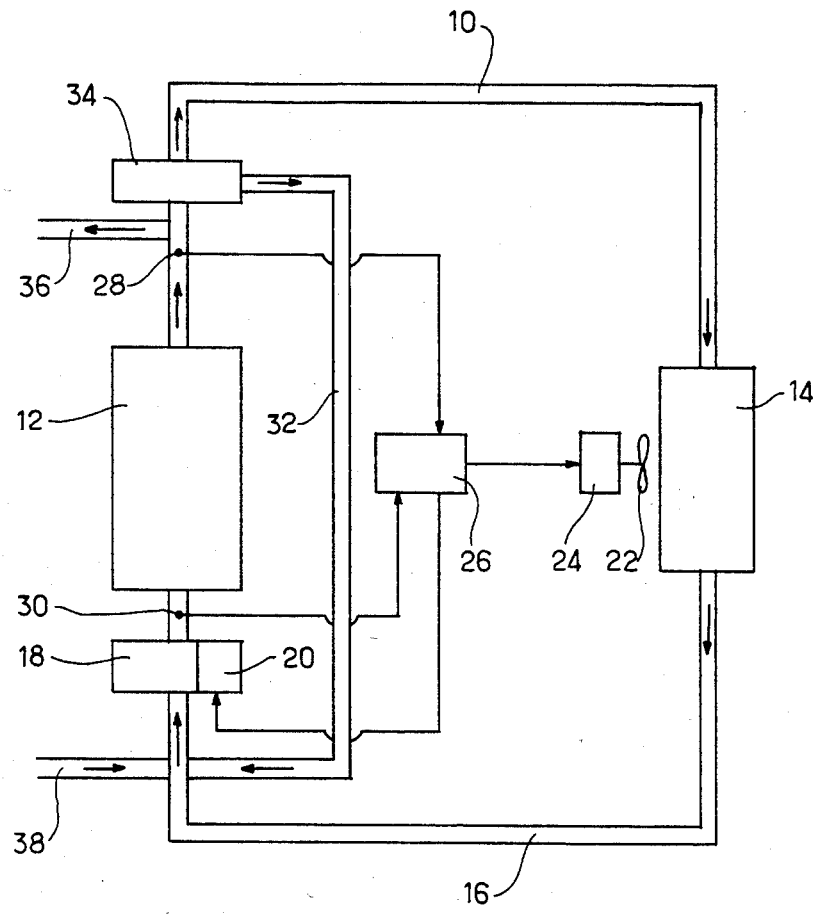

United States Patent [19]
N Gueyen

[11] Patent Number: 4,557,223
[45] Date of Patent: Dec. 10, 1985

[54] COOLING DEVICE FOR AN INTERNAL COMBUSTION ENGINE

[75] Inventor: Huu-Can N Gueyen, Portet-sur-Garonne, France

[73] Assignee: Equipements Automobiles Marchal, Issy-Les-Moulineaux, France

[21] Appl. No.: 604,646

[22] PCT Filed: Jul. 26, 1983

[86] PCT No.: PCT/FR83/00157
§ 371 Date: Apr. 5, 1984
§ 102(e) Date: Apr. 5, 1984

[87] PCT Pub. No.: WO84/00578
PCT Pub. Date: Feb. 16, 1984

[30] Foreign Application Priority Data
Aug. 5, 1982 [FR] France .................. 8213687

[51] Int. Cl.$^4$ .............................................. F01P 7/14
[52] U.S. Cl. ............................ 123/41.12; 123/41.44
[58] Field of Search ............... 123/41.02, 41.08, 41.09, 123/41.1, 41.29, 41.44, 41.49, 41.12

[56] References Cited
U.S. PATENT DOCUMENTS

| | | | |
|---|---|---|---|
| 4,381,736 | 5/1983 | Hirayama | 123/41.29 |
| 4,387,670 | 6/1983 | Robin et al. | 123/41.08 |
| 4,475,485 | 10/1984 | Sakakibara et al. | 123/41.44 |

FOREIGN PATENT DOCUMENTS 2455174  11/1980  France .................. 123/41.49

Primary Examiner—William A. Cuchlinski, Jr.
Attorney, Agent, or Firm—Brisebois & Kruger

[57] ABSTRACT

The invention relates to a cooling device for an internal combustion engine. In accordance with the invention, the control unit (26) of the device is sensitive to the temperatures given by two sensors (30 and 28) disposed at the inlet and the outlet of the engine (12), and controls the speed variations of two electric motors (20, 24) for driving a pump (18) and a fan (22) associated with the radiator (14). When the outlet temperature $T_{MS}$ of the engine (12) reaches a threshold $S_F$ which is lower than the threshold $S_V$ for the opening of the thermostat valve (34), the pump rotates at a speed $V_1$ which is automatically controlled in such a way that the temperature variations $\Delta T_M$ between the inlet and the outlet of the engine (12) remains lower than or equal to a limit value $\Delta S_M$. When $T_{MS}$ reaches $S_V$, $T_{MS}$ is in addition regulated to a reference value $S_3$ which is greater than $S_V$ by automatically controlling the speed of the pump. The fan (22) is only driven after the pump (18) has reached its maximum speed. For use with the engines of automobile vehicles.

7 Claims, 2 Drawing Figures

COOLING DEVICE FOR AN INTERNAL COMBUSTION ENGINE

The present invention relates to a cooling device for an internal combustion engine, and relates more particularly to a cooling device of this type whose components are controlled by a hierarchical automatic control.

Present automobile vehicles are frequently provided with an internal combustion engine cooled by a device which essentially comprises a cooling fluid circuit, using water in the majority of cases, which is closed and disposed in an internal cooling circuit of the engine, and in which the fluid is displaced by a circulation pump driven by the internal combustion engine by means of a drive belt which engages with the pulley of the engine crankshaft. In a circuit of this type, the cooling fluid or liquid is delivered to the engine by the pump so as to cool the engine and the heated fluid is then passed through a supply duct to the intake of a heat exchanger or radiator, in which the fluid is cooled and discharges its heat into the surrounding medium. The heat exchanges between the cooling fluid and this medium may be activated in the radiator by a fan which is either driven by the engine or the pump, or driven in an independent manner by an electric motor disposed within a cooling motor fan unit, whose actuation is controlled by a heat contact disposed on the radiator. On discharge from the radiator, the cooling fluid is drawn into the pump and delivered to the engine via a return duct. In addition, a branch duct is connected to the return duct, upstream of the pump, and to the supply duct by means of a thermostat valve. When the engine is started from cold, the thermostat valve causes the fluid to circulate solely in the branch duct and prevents any of the fluid from circulating to the radiator until the temperature of the fluid reaching the thermostat valve has reached a predetermined temperature threshold at which the valve begins to open in order to enable the radiator to be supplied with fluid to be cooled.

Cooling devices of this type also preferably comprise various circuits for heating the carburettor or for the pre-heating of the fuel as well as a circuit for heating the passenger area which comprise, for example, a tap for switching the heating on and off which controls the supply of a heating radiator in which the heat exchanges may be amplified by means of a motor fan heating unit, these circuits being provided as branch lines in the main cooling circuit and being connected, upstream of the thermostat valve, to the supply duct of the main cooling circuit and, upstream of the circulation pump, to the return duct of the main circuit.

It is known that in order to increase the efficiency of an internal combustion engine and in order to reduce pollution levels by decreasing the non-combusted hydrocarbon content of the exhaust gases, it is necessary to keep the cooling fluid at a substantially constant optimum temperature, as far as this is possible. As the fluid pump is driven by the internal combustion engine, the speed of rotation of the pump, and therefore its rate of flow, are proportional at each instant to the engine speed. Consequently, the heat exchanges in the radiator, under normal conditions of operation of the engine, are too great and the fluid is cooled to too great an extent, since the radiator is dimensioned in such a way that its dissipation capacity is sufficient for the most critical operating conditions of the engine with respect to heating, i.e. when the engine is idling or operating at low speed and with a full load, in which conditions the pump is driven at a low speed, or when the vehicle is moving at low speed, in which case the air passing through the radiator has a low speed. Consequently, the engine is not kept at its optimum operating temperature.

Excessive heat exchange levels in the radiator are compensated by the thermostat valve which decreases the mean radiator supply flow in order to reduce the heat exchanges. However this step involves certain drawbacks. The pump is almost constantly driven at a speed which is excessive with respect to requirements, leading to a superfluous and non-negligible consumption of the mechanical drive power taken from the output shaft of the engine. This energy dissipation may reach 600 W at high speeds, including the losses with respect to the drive belt, in the case of a vehicle of European design having an average cubic capacity.

In addition, the thermostat valve also determines the temperature of the cooling fluid. As these thermostat valves are subject to an operating hysteresis, since the closing temperature differs by approximately 10° C. from the opening temperature and as their precision performances are mediocre, a relatively low engine operating temperature is generally used, which temperature is detrimental to the achievement of suitable efficiency and suitable performances with respect to pollution control, so that transient excess temperatures and the consequences of the operating hysteresis of the thermostat valve may be accepted without risk. Finally, the time required to bring the cooling fluid to the correct temperature is comparatively long, in particular as a result of the fact that the engine idling speed is fairly high when the starter has been actuated.

In order to remedy these drawbacks, the French Patent Specification No. 77 07 800 discloses a device of this type, in which the pump is driven at a speed which is independent of that of the internal combustion engine by a variable speed electric motor whose speed variation is controlled by a control unit as a function of the temperature of the cooling fluid measured on discharge from the internal combustion engine by a first temperature sensor and possibly as a function of the temperature of the fluid measured on discharge from the radiator by a second temperature sensor, and as a function of the underpressure at the internal combustion engine intake measured by a suitable sensor. This control unit simultaneously controls the speed of rotation of a second electric motor which drives the fan, as a function of the measurements taken by the second temperature sensor disposed at the radiator outlet.

In order to enable the optimum operation of the device disclosed in the above-mentioned French Patent Specification, the first Patent of Addition to the latter proposes to ensure the regulation of the cooling fluid temperature by acting solely on the speed of the circulation pump in the first instance and then by actuating the fan associated with the radiator in the second instance, and solely when the pump is operating at full speed. Whilst the temperature T of the fluid at the engine outlet is lower than a first threshold, the pump rotates at minimum speed and is then accelerated to its maximum speed when the temperature T reaches a second threshold, which is higher than the first, and the fan may only be driven from the time at which the temperature T reaches a third threshold which is higher than the first and preferably equal to or higher than the second. The fan is actually driven when the temperature of the fluid at the radiator outlet is greater than a fourth threshold and the fan is driven at its maximum speed when the temperature T reaches a fifth threshold which is higher than the third threshold. The thermostat valve begins to open when the temperature T reaches a sixth threshold, which is lower than the first, and is completely open when T reaches a seventh threshold which is lower than or equal to the first. The device described in this first Patent of Addition has, however, the drawback that the control unit, which is sensitive to five temperature thresholds which may all be different and which differ from the two other operating thresholds of the thermostat valve, is a complicated and therefore costly construction, whereas the operating improvements obtained are relatively modest with respect to the complexity of the control of the device.

For this reason, the French Patent Specification No. 77.13 032 discloses improvements to the device of the French Patent Specification No. 77.07 800. In accordance with these improvements, operation of the thermostat valve is also controlled by the control unit as a function of the temperature measurements made by the first sensor mounted at the outlet of the combustion engine and/or by the second sensor disposed at the radiator outlet.

This device, in which the speed of rotation of the electric drive motor of the pump, the speed of rotation of the electric drive motor of the fan and the operation of the thermostat valve are all controlled as function of measurements of the cooling fluid temperature, on one hand at the outlet of the internal combustion engine and, on the other hand, at the radiator outlet, has the drawback that it is costly, as a result of the type of thermostat valve which has to be used, since this valve is provided with an operating member which may, for example, be constituted by at least one heat expansion capsule designed to be heated by an electrical resistance supplied by the control unit. It is more difficult to cause this device to operate in optimum conditions as a result of the large number of possible combinations of the various operating control parameters of the various components of the device.

The first Patent of Addition to the French Patent Specification No. 77.13 032 proposes a method of using the device disclosed in this latter patent which is particularly advantageous. In accordance with this Patent of Addition, the circulation of the cooling fluid in the radiator begins when the temperature T of the fluid at the outlet of the internal combustion engine reaches a first threshold, and reaches a maximum when T reaches a second threshold which is higher than the first, wherein the pump is kept at a minimum speed while T is lower than a third threshold which is higher than the first and is driven at maximum speed when T reaches a fourth threshold which is higher than the third, whereas the fan may only come into operation if T reaches a fifth threshold which is higher than the third, and wherein the third and fifth thresholds may be higher than the second and fourth thresholds respectively, and the fan only comes into actual operation if the temperature of the fluid at the radiator outlet is simultaneously higher than a sixth threshold.

This circuit also has the drawback that it operates using a relatively complex control logic and in particular, as is also the case for the circuits described in the French Patent Specification Nos. 77.13 032 and 77.07 800 and the first Patent of Addition to the latter, the control of all the members driven by the control unit takes place essentially, if not solely, as a function of the temperatures of the fluid at the outlet of the internal combustion engine and at the radiator outlet.

Although an excessive temperature of the fluid at the radiator outlet is sufficient indication that the heat exchanges to the right of the radiator should be increased by causing the associated fan to rotate or by increasing its speed of rotation, monitoring of the temperature of the fluid on discharge from the internal combustion engine and the regulation of this temperature does not guarantee in any way that the internal combustion engine is at its optimum operating temperature or at a temperature which is close thereto.

The present invention relates to a device of the type of those described in the above-mentioned patents and patents of addition, whose performance is improved with respect to the known devices, from the following points of view:

the reduced amount of power taken from the drive shaft for the operation of the cooling device, the precision and the high level of the operating temperature of the internal combustion engine, which leads to an increased efficiency of this engine, the rapidity of the temperature increase of the cooling fluid, and therefore of the engine oil and the said engine, the ease with which the device may be installed in the internal combustion engine and, more particularly, in a vehicle provided with this engine.

The invention relates to a cooling device which is simply constructed, whose driven components are mechanically independent of the internal combustion engine and have their speed controlled in automatic manner in accordance with a simple logic and whose operations are given hierarchical status as a function of the data supplied by two sensors alone.

The invention also relates to a cooling device which operates by taking into account the data supplied by two sensors grouped on the internal combustion engine in order to adapt the power consumed by the cooling device to the amount of heat to be evacuated in the best way possible.

The invention finally relates to a cooling device which regulates the operating temperature of the internal combustion engine whilst maintaining the variation between the input temperature and the discharge temperature of the fluid in the engine at a value which is lower than a predetermined suitable limit value.

For this purpose, the cooling device of an internal combustion engine, designed in particular for use with an automobile vehicle, comprises:

in the first instance, a closed circuit on the engine, in which a cooling fluid is displaced by the action of at least one circulation pump driven by a variable speed electric motor, the said motor being controlled by a control unit which is sensitive to the data supplied by a sensor detecting the temperature of the fluid at the outlet of the engine, the fluid passing, on discharge from the engine, through at least one supply duct, into at least one heat exchanger associated with at least one fan driven by a variable speed electric motor which is also controlled by the control unit, the said fluid being returned, on discharge from the exchanger, via at least one return duct, to the circulation pump, which re-supplies the engine with cooling fluid, and in the second instance, a branch duct, which is connected to the return duct, upstream of the circulation pump, and to the supply duct, at the location of a thermostat valve designed, on one hand, to prevent the fluid from circulating into the exchanger while the temperature $T_{MS}$ of the fluid on discharge from the engine is lower than a first temperature threshold $S_V$ and, on the other hand, to open as soon as the temperature $T_{MS}$ is greater than or equal to $S_V$ such that the fluid circulates into the exchanger and, finally, to close as soon as $T_{MS}$ is lower than or equal to $S_V + \Delta S_V$, wherein $\Delta S_V$ is a positive, negative or zero threshold variation, which device is characterised in that the control unit is also sensitive to the data supplied by the sensor detecting the fluid temperature on input into the engine, downstream of the pump, and causes, when $T_{MS}$ reaches a second temperature threshold $S_F$ which is lower than the first threshold $S_V$, the pump to be driven at a first speed $V_1$ which is automatically controlled such that the variation $\Delta T_M$ between the temperature of the fluid on discharge from the engine $T_{MS}$ and the temperature of the fluid on input into the engine $T_{ME}$ assumes a value which is lower than or equal to a limit value $\Delta S_M$.

The device of the invention therefore combines the effects of the opening and closing of a thermostat valve which is independent and therefore of an inexpensive type, and which is sensitive to a temperature threshold which is its own in order to bring the radiator into operation, with those of the driving of the pump at an automatically controlled speed such that the temperature difference of the cooling fluid between input and discharge from the internal combustion engine is kept below a suitably selected limit value, which is a condition of particular importance in the correct operation of the engine.

The automatic control of the speed $V_1$ of the pump is advantageously such that the control unit causes the pump to be driven at a constant speed $V_1$ while the variation $\Delta T_M$ remains below the limit value $\Delta S_M$ and, as soon as this variation $\Delta T_M$ becomes greater than $\Delta S_M$, drives the pump at an increased speed $V_1$ until $\Delta T_M$ is limited by $\Delta S_M$.

In addition, when the temperature $T_{MS}$ of the cooling fluid on discharge from the engine reaches the first threshold $S_V$, which is the threshold of the thermostat valve, the control unit causes the pump to be driven at a speed which is automatically controlled by the temperature $T_{MS}$, in order to regulate this temperature $T_{MS}$ to a reference value $S_3$ which is higher than the first threshold $S_V$. When these conditions are fulfilled, if the variation $\Delta T_M$ becomes greater than the limit $\Delta S_M$, the speed of the pump is automatically controlled by the difference $\Delta T_M - \Delta S_M$ and is raised to a value which is sufficient to cancel out this difference.

The hierarchical automatic control of the device of the invention is such that the fan is not caused to rotate during the regulation of the temperature of the cooling fluid $T_{MS}$ on discharge from the engine to the reference value $S_3$ if the speed of the pump remains lower than its maximum value. However, if, at the maximum speed of the pump, the temperature $T_{MS}$ remains greater than the reference value $S_3$, the control unit causes the fan to be driven whilst maintaining the pump at its maximum speed. As the fan is being driven, if the temperature $T_{MS}$ drops below the reference value $S_3$, the control unit then causes the speed of the fan to decrease. Finally, if the temperature $T_{MS}$ stays lower than the reference value $S_3$ after stoppage of the fan, the control unit then causes the speed of the pump to decrease.

The regulation of the device of the invention only depends therefore on the measurements of two variables, i.e. the temperature $T_{MS}$ of the cooling fluid on discharge from the engine and the variation between the temperatures of the fluid on input and on discharge from the engine, in order to act on the values which two other variables should assume, i.e. the speeds of the pump and the fan, after comparison of one of the measured variables, i.e. the temperature $T_{MS}$, with two thresholds $S_V$ and $S_F$, and subsequent regulation of this variable to a single reference value $S_3$, whereas the other measured variable, $\Delta T_M$, is kept lower than a limit value $\Delta S_M$ which is a fourth constant of comparison for the regulation of the device. As one of the thresholds $S_V$ is that of the thermostat valve, which is independent of the control unit, the latter is only set for the three other comparison constants, which simplifies its construction. In addition, the device only comprises two components designed to be driven, i.e. the two variable speed electric motors, one of which drives the pump and the other of which drives the fan, the driving being carried out by means of a single variable speed drive which may be switched to one or other of the two components by means of a simple sequential logic.

Advantageously, in accordance with the invention, during the operation for bringing the engine to its correct temperature, the control unit causes, in addition, whilst the temperature of the fluid on discharge from the engine $T_{MS}$ is lower than the second threshold $S_F$, the pump to be driven at a second speed $V_2$ which is lower than $V_1$ and very low or zero, so as to facilitate the rapid temperature increase of the cooling fluid.

Figure 2:
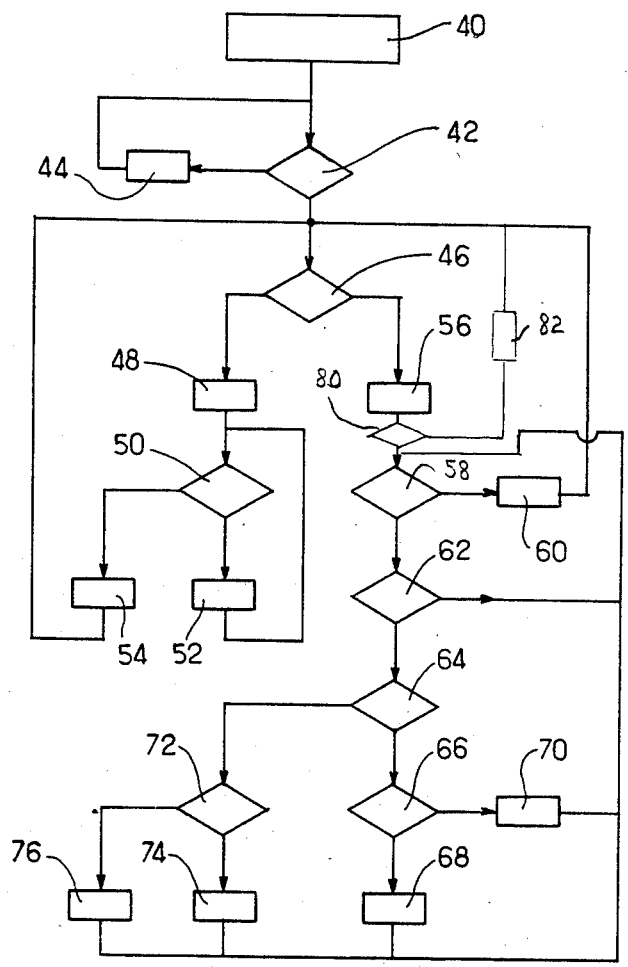

In order to illustrate the subject matter of the invention in a detailed manner, an embodiment thereof is now described, by way of a non-limiting example, with reference to the attached drawings, in which:

FIG. 1 is a diagrammatic view of a cooling device of an internal combustion engine, and more particularly of the main cooling circuit of a device of this type, and FIG. 2 is a flow chart of the control carried out by an electronic control unit of the device of FIG. 1.

The cooling device shown in FIG. 1 comprises a main cooling circuit constituted by a supply duct 10 whose inlet is connected to the outlet of the internal cooling circuit of an internal combustion engine 12, by a radiator 14 whose inlet is connected to the outlet of the supply duct 10, by a return duct 16 whose inlet is connected to the outlet of the radiator 14 and whose outlet is connected to the inlet of the internal cooling circuit of the engine 12. A pump 18 driven by a variable speed electric motor 20 is mounted on the return duct 16. The radiator 14 is ventilated by a motor fan cooling unit comprising a fan 22 driven by a second variable speed electric motor 24, the variations of the speeds of rotation of the electric motors 20 and 24 being controlled by an electronic control unit 26 which receives the measurements taken by two sensors of the temperature of a cooling fluid, such as water. One of these temperature sensors 28 is disposed at the outlet of the engine 12 whereas the other sensor 30 is disposed at the inlet of the engine 12. A branch duct 32 is connected to the return duct 16 upstream of the pump 18 and to the supply duct 10 downstream of the sensor 28 by means of a thermostat valve. The cooling device also comprises auxiliary circuits for heating the carburettor or for the pre-heating of the fuel as well as for the heating of the passenger space of the automobile vehicle provided with the motor 12, these auxiliary circuits (not shown) being connected by the duct 36 to the supply duct 10, between the sensor 28 and the thermostat valve 34, and by the duct 38 to the return duct 16, upstream of the pump 18.

If the quantities of heat evacuated respectively by the cooling device and by the radiator 14 are designated by $Q_E$ and $Q_R$, and if the mass flow rates of the fluid in the engine 12 and in the radiator 14 respectively are designated by m and $m_R$, and if the temperature variations between the outlet and the inlet respectively of the engine 12 and the radiator 14 are designated by $\Delta T_M$ and $\Delta T_R$, and if $T_{MS}$ and $T_a$ represent the respective temperatures of the cooling fluid on discharge from the engine and the ambient air, and if C designates the mass specific heat of the cooling fluid and K the overall exchange coefficient of the radiator 14, which increases at the same time as the flow of the fluid passing through the radiator 14 and the speed of the air passing through the radiator 14, the equations which govern the heat exchanges are:

at the engine 12:

$$Q_E = m.C.\Delta T_M \quad (1)$$

at the radiator 14:

$$Q_R = m_R.C.\Delta T_R \quad (2)$$

and $$Q_R = K(T_{MS} - T_a) \quad (3)$$

If $Q_a$ shows the amount of heat evacuated through the auxiliary circuits, the total amount of heat $Q_E$ evacuated via the cooling device is the sum of $Q_R$ and $Q_a$.

In order to obtain a suitable heat equilibrium of the engine 12, it is obvious that at each instant the total amount of heat evacuated $Q_E$ must be equal to the amount of heat Q to be evacuated which is given off by the engine 12.

If $Q_E$ is lower than Q, the engine is heating, whereas if $Q_E$ is greater than Q the engine is cooling. The function of the cooling device for an internal combustion engine is precisely to act in such a way that the amount of heat evacuated $Q_E$ is as close as possible to the amount of heat Q to be evacuated. However, whilst carrying out this function, the cooling deice should simultaneously maintain the temperature of the cooling fluid at a certain reference value in a manner which is as stable and accurate as possible, and limit the difference between the temperatures of the cooling fluid on discharge from and on input into the engine 12 to a suitable value.

In the case of the cooling devices known from the prior art, in which the pump is driven by the internal combustion engine, the flow of cooling fluid m which circulates in the engine is set by the latter as the speed at which the pump is driven is proportional to the speed of rotation of the engine. In accordance with equation (1), the optimum regulation of a device of this type is that which enables, at each instant, the achievement of a temperature variation $\Delta T$ between the inlet and the outlet of the engine such that the product of $m.C.\Delta T$ is always equal to the amount Q of heat to be evacuated. In addition, equation (3) shows that the amount $Q_R$ of heat evacuated by the radiator is proportional to the overall coefficient of exchange K of the radiator and is therefore also defined for a given flow of fluid in the radiator and a given speed of the air passing through this radiator. In order to obtain on average the equality $Q_E = Q_R + Q_a$ the only possibility of regulation is to act on the thermostat valve such that the mean flow of cooling fluid circulating in the radiator is regulated.

The cooling device shown in FIG. 1 enables the modulation of both the speed at which the pump 18 is driven, i.e. also the rate of flow of the cooling fluid circulating in the engine 12 and in the radiator 14, and the speed at which the fan 22 of the motor fan unit is driven, i.e. also the overall coefficient of exchange K of the radiator.

This possibility of modulation of the driving speeds of the two components driven by the device reduces the part played by the thermostat valve 34 to a minimum. The latter only comes into operation in cases in which the temperature variation $\Delta T_M$ between the outlet and the inlet of the engine 12 is greater than a certain limit value $\Delta S_M$ set by the limit conditions for the operation of the engine 12.

The mode of operation of the device shown in FIG. 1 is described below with reference to the flow chart shown in FIG. 2.

From an initial configuration 40, in which the speeds of the pump 18 and the fan 22 are zero, and the engine 12 is switched off, when the latter is brought into operation there is in the first instance a stage in which the engine is brought to a suitable temperature, during which the pump 18 is driven at 44 at a minimum speed $V_2$, which may be very low, or even zero, in order to enable a very rapid increase of the temperature of the fluid, whilst it is detected at 42 that the temperature of the fluid $T_{MS}$ on discharge from the engine 12 is lower than a given temperature threshold $S_F$, set for example at 60° C., as the valve 34, which is closed, cuts off the supply to the radiator 14 and displaces the cooling fluid to the pump 18 via the branch duct 32. During this stage, the variation $\Delta T_M$ between the temperatures on inlet into and on discharge from the engine is not significant.

When it is observed at 42 that the temperature $T_{MS}$ has reached the threshold $S_F$, the pump is driven at another minimal speed $V_1$, which is not zero and is greater than $V_2$, this speed $V_1$ being sufficient to enable the circulation of the cooling fluid in the auxiliary cooling circuits of the device via the ducts 36 and 38. The control unit 26 automatically controls this speed $V_1$ such that the temperature variation $\Delta T_M$ between the inlet and the outlet of the engine 12 is not greater than a limit value $\Delta S_M$, set for example at 7° C.

This is ensured by maintaining the speed of the pump 18 at the minimal speed $V_1$ for as long as $\Delta T_M$ is lower than or equal to $\Delta S_M$, then by increasing the speed of pump as soon as $\Delta T_M$ becomes greater than $\Delta S_M$, until the time at which $\Delta T_M$ becomes equal to $\Delta S_M$ again.

Monitoring is carried out at 46 to ascertain whether the temperature $T_{MS}$ on discharge from the engine 12 is greater than or equal to a second threshold $S_V$ for the opening of the thermostat valve 34, set for example at 86° C. If this is not the case, the valve 34 remains closed at 48 and monitoring is carried out at 50 to ascertain whether the temperature variation $\Delta T_M$ is greater than the limit value $\Delta S_M$.

If this is the case, the speed of rotation of the pump is increased at 52 until the time at which it is observed at 50 that $\Delta T_M$ is again equal to $\Delta S_M$. The speed of the pump is then adjusted at 54 to its minimal value $V_1$ which is not zero.

If it is observed at 46 that the temperature $T_{MS}$ has become greater than the threshold $S_V$, the thermostat valve 34 opens at 56 and it is ascertained at 58 whether the variation $\Delta T_M$ is greater than the limit value $\Delta S_M$. If this is the case, with the speed of the fan still being zero, the speed of the pump 18 is increased at 60 until the time when the variation $\Delta T_M$ is lower than or equal to $\Delta S_M$.

The opening threshold $S_V$ of the thermostat valve 34 is in general slightly different from its closure threshold $S_V + \Delta S_V$, although as this has no effect on the regulation of the device, it can be considered that $\Delta S_V$ is zero.

After opening of the valve 34, the speed of the pump is automatically regulated by the control unit 26 to the temperature $T_{MS}$ measured at the outlet of the engine 12, such that the latter is set to a reference value $S_3$ set for example at 105° C.

However, at each instant, the temperature variation $\Delta T_M$ between the inlet and the outlet of the engine is compared with $\Delta S_M$. If it exceeds the limit value $\Delta S_M$, the speed of the pump is automatically controlled by the difference $\Delta T_M - \Delta S_M$, and the speed is increased such that this difference is cancelled out. This is generally carried out to the detriment of the temperature $T_{MS}$ which decreases. If the decrease of the temperature $T_{MS}$ is such that the latter again becomes lower than or equal to the threshold $S_V$, the thermostat valve 34 acts in such a way that the temperature $T_{MS}$ is maintained at the level of the threshold $S_V$.

If it is ascertained at 62 that the temperature $T_{MS}$ is equal to the reference value $S_3$, no correction is carried out. However, if this is not the case, it is ascertained at 64 whether the temperature $T_{MS}$ is greater than the reference value $S_3$. If this is the case, it is ascertained at 66 whether the pump is already being driven at its maximum speed. If this is the case, the fan is then driven at 68 at an increasing speed until the time at which the temperature $T_{MS}$ is brought to its reference value $S_3$. If this is not the case, the speed of the pump is increased, in the first instance, at 70. The fan 22 is only driven when the said pump reaches its maximum value without the possibility of decreasing $T_{MS}$ to $S_3$.

If it is ascertained at 64 that the temperature $T_{MS}$ is lower than the reference value $S_3$, monitoring is carried out at 72 to ascertain whether the fan 22 is off. If this is the case, the speed decrease of the pump is controlled at 74 until the temperature $T_{MS}$ is again equal to $S_3$. If this is not the case, the speed at which the fan 22 is being driven is decreased, in the first instance, at 76, and if $S_3$ has still not been reached after the stoppage of the fan 22 ascertained at 72, the speed of the pump is decreased at 74 in order to bring the temperature $T_{MS}$ to the reference value $S_3$.

It can therefore be seen that, during the stage in which the temperature $T_{MS}$ is regulated to the limit value $S_3$ and $\Delta T_M$ is regulated to a value which is lower than or equal to the limit value $\Delta S_M$, which is ensured by the automatic control of the speed of the pump, whilst the latter is not being driven at its maximum speed, the fan 22 of the motor fan cooling unit is not driven. This preferential operation of the pump with respect to the fan enables the achievement of the smallest temperature variation $\Delta T_M$, on the basis of equations (1) and (2) given above.

The automatic control of the speed at which the fan 22 is driven in order to regulate the temperature $T_{MS}$ to the reference value $S_3$ only takes place when the pump is at maximum speed and the temperature $T_{MS}$ is greater than the reference value $S_3$ whereas the temperature variation $\Delta T_M$ is lower than or equal to the limit value $\Delta S_M$.

Finally, the test 80 and the operation 82 represent a safety operation. If the temperature $T_{MS}$ exceeds a certain limit, for example 115° C., or if one of the two temperature sensors is short-circuited or cut off, the test 80 triggers the operation 82 which consists in bringing the pump and the fan to maximum speed, without taking into account the temperature variation $\Delta T_M$.

It can therefore be seen that the regulation of the temperature of the cooling fluid is obtained with the minimum possible power consumption, since the fan 22 is only operated when this is absolutely necessary and the pump is only brought to a higher speed level after opening of the thermostat valve. The overall efficiency of the cooling device is therefore improved, to the extent that even if the efficiency of the supply alternator of the electric motors is mediocre, the power gain may reach, on average, several hundred watts. The device of the invention therefore enables considerable power savings in the power taken from the drive shaft by means of a very fine adaptation of the power consumption of the components driven by the cooling device to the amount of heat to be evacuated.

The temperature of the engine 12 is set to a reference value $S_3$ which is higher and more accurate than in the case of the devices of the prior art, which facilitates an improvement of the efficiency of the engine 12, and the device also enables the reference value $S_3$ selected to be adapted to the engine load. In addition, in the case of starting from cold, the fuel consumption of the engine 12 is reduced as a result of the fact that the cooling fluid is brought to the correct temperature more rapidly than in the case of known apparatus. In addition, the mechanical independence of the pump, on one hand, and the motor fan cooling unit, on the other hand, with respect to the internal combustion engine greatly facilitates the installation of a cooling device of this type in an engine.

All the above-mentioned advantages provide appreciable savings in the fuel consumed by the engine.

It is obvious that the device described above is in no way limiting and may be subject to any suitable modification without departing from the scope of the invention.

I claim:

1. A cooling system for an internal combustion engine, in particular for an automobile, said system comprising a closed cooling circuit in which a liquid coolant is circulated by the action of at least one circulating pump driven by a variable speed electric driving motor, a sensor for detecting the temperature $T_{MS}$ of the coolant discharged from a coolant outlet of the engine, the coolant passing, after discharge from the engine, through at least one supply duct into at least one heat exchanger associated with at least one fan driven by a variable speed electric driving motor, said coolant being returned, after discharge from said heat exchanger, through at least one return duct to the circulating pump which supplies the coolant to a coolant inlet of the engine, a bypass duct connected to said return duct upstream of said circulating pump, and to said supply duct at a location of a thermostat valve for preventing coolant from circulating to the heat exchanger while the temperature, $T_{MS}$, of the coolant discharged from the engine is lower than a first threshold temperature $S_V$, and for opening when $T_{MS}$ is greater than or equal to $S_V$ so that fluid is circulated through the heat exchanger and for again closing when $T_{MS}$ is lower than or equal to $S_V+\Delta S_V$, wherein $\Delta S_V$ is positive, negative or zero, a second sensor for detecting the temperature of the coolant entering the engine, an electronic control unit for controlling the operation and speed of the fan driving motor and the pump driving motor in response to the temperatures sensed by the first and second sensors, such that when the temperature $T_{MS}$ of coolant discharged from the engine reaches a threshold $S_F$ which is lower than $S_V$, the pump is driven at a first speed $V_1$ which is automatically controlled to maintain the temperature variation $\Delta T_M$ of the coolant between the inlet and the outlet of the engine at a value which is lower than or equal to a limit value $\Delta S_M$, the pump is driven at a constant speed $V_1$ for as long as the variation $\Delta T_M$ is lower than the limit value $\Delta S_M$ and, as soon as the variation $\Delta T_M$ becomes greater than $\Delta S_M$, at an increased speed $V_1$ until $\Delta T_M$ is limited by $\Delta S_M$, and when $T_{MS}$ reaches threshold $S_V$, the control unit controls the driving of the pump at a speed automatically controlled by the temperature $T_{MS}$ in order to regulate this temperature $T_{MS}$ to a reference value $S_3$ which is greater than the first threshold $S_V$.

2. The system as claimed in claim 1 wherein if the variation $\Delta T_M$ becomes greater than $\Delta S_M$, the speed $V_1$ of the pump is automatically controlled by the difference $\Delta T_M - \Delta S_M$ and increases to a value sufficient to cancel out this difference.

3. The system as claimed in claim 2 wherein the fan is not driven during the regulation of the temperature $T_{MS}$ to the reference value $S_3$ and the limitation of the variation $\Delta T_M$ to the limit value $\Delta S_M$.

4. The system as claimed in claim 3 wherein if, at the maximum speed of the pump, the temperature $T_{MS}$ remains greater than the reference value $S_3$, the control unit drives the fan so that the temperature $T_{MS}$ is regulated to $S_3$.

5. The system claimed in claim 4 wherein if the temperature $T_{MS}$ becomes lower than the reference value $S_3$ and if the fan is being driven, the speed of the fan is decreased.

6. The system as claimed in claim 5 wherein if the temperature $T_{MS}$ remains lower than the reference value $S_3$ after the fan is stopped, the speed of the pump is decreased.

7. The system of claim 1 wherein, while the engine is being brought to its correct temperature, the temperature $T_{MS}$ is lower than the second threshold $S_F$, the pump is driven at a second speed which is lower than the first speed and very low or zero, in order to facilitate the rapid increase of the temperature of the coolant in the engine.

* * * * *